(12) United States Patent  
Ricci-Ottati et al.

(10) Patent No.: US 7,744,664 B2
(45) Date of Patent: Jun. 29, 2010

(54) COMPACT COUNTERFLOW FUEL REFORMER

(75) Inventors: Giulio A. Ricci-Ottati, Burton, MI (US); John E. Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 491 days.

(21) Appl. No.: 11/599,855

(22) Filed: Nov. 15, 2006

(65) Prior Publication Data

US 2008/0110427 A1 May 15, 2008

(51) Int. Cl.
F02B 47/04 (2006.01)
B01J 19/00 (2006.01)
C10G 49/00 (2006.01)

(52) U.S. Cl. .......................... 48/127.9; 123/1; 422/187; 422/189; 208/134

(58) Field of Classification Search .................... 48/187
See application file for complete search history.

(56) References Cited

U.S. PATENT DOCUMENTS 4,650,651 A * 3/1987 Fuderer ..................... 422/191
6,126,908 A   10/2000 Clawson et al.
7,037,349 B2  5/2006 Dauer et al.
2004/0151663 A1* 8/2004 Nougier et al. .......... 423/648.1
2005/0198900 A1  9/2005 Nashburn et al.
2005/0235654 A1* 10/2005 Kaupert et al. ............... 62/50.2

* cited by examiner

Primary Examiner—Alexa D Neckel
Assistant Examiner—Imran Akram
(74) Attorney, Agent, or Firm—Thomas N. Twomey

(57) ABSTRACT

A catalytic reformer assembly comprising a mixing chamber wherein fuel and air are mixed. The wall of the mixing chamber tapers toward an outlet end. A catalyst bed formed in an annular shape surrounds the outlet end such that the walls of the mixing chamber shield the catalyst from direct exposure to fuel droplets injected into the mixing chamber. The fuel/air mixture flows out of the mixing chamber, then turns and counterflows through the catalyst bed outside the mixing chamber. Hot reformate from the catalyst bed flows in a reformate flow chamber extending along the outer surface of the walls of the mixing chamber, heating the wall surface within the mixing chamber for instantaneous evaporation of injected fuel. A plenum for incoming air surrounds the reformate flow chamber which is also heated thereby.

15 Claims, 4 Drawing Sheets

US 7,744,664 B2

COMPACT COUNTERFLOW FUEL REFORMER

TECHNICAL FIELD

The present invention relates to a catalytic hydrocarbon reformer for converting a hydrocarbon stream to a gaseous reformate fuel stream comprising hydrogen; more particularly, to a fast light-off catalytic reformer; and most particularly to a method and apparatus for rapid heating and vaporization of liquid hydrocarbon fuel and good mixing of vaporized fuel and air, especially during cold start-up of a hydrocarbon reformer. The present invention is useful for providing reformate rapidly after start-up to a fuel cell, especially a solid oxide fuel cell, or to an internal combustion engine or vehicle exhaust stream to improve emission reduction performance.

BACKGROUND OF THE INVENTION

A catalytic hydrocarbon fuel reformer converts oxygen and a fuel comprising, for example, natural gas, light distillates, methanol, propane, naphtha, kerosene, gasoline, diesel fuel, bio-diesel or combinations thereof, into a hydrogen-rich reformate stream comprising a gaseous blend of hydrogen, carbon monoxide, and nitrogen, plus trace components. In a typical reforming process, the hydrocarbon fuel is percolated with oxygen in the form of air through a catalyst bed or beds contained within one or more reactor tubes mounted in a reformer vessel. The catalytic conversion process is typically carried out at elevated catalyst temperatures in the range of about 700° C. to about 1100° C.

The produced hydrogen-rich reformate stream may be used, for example, as the fuel gas stream feeding the anode of an electrochemical fuel cell. Reformate is particularly well suited to fueling a solid-oxide fuel cell (SOFC) system because a purification step for removal of carbon monoxide is not required as in the case for a known proton exchange membrane (PEM) fuel cell systems.

The reformate stream may also be used in spark-ignited (SI) or diesel engines. Reformate can be a desirable fuel or fuel-additive; the reformate stream also can be injected into the vehicle exhaust to provide benefits in reducing vehicle emissions. Hydrogen-fueled vehicles are of interest as low-emissions vehicles because hydrogen as a fuel or a fuel additive can significantly reduce air pollution and can be produced from a variety of fuels. Hydrogen permits a SI engine to run with very lean fuel-air mixtures that greatly reduce production of NOx. As a gasoline additive, small amounts of supplemental hydrogen-rich reformate may allow conventional gasoline-fueled internal combustion engines to reach nearly zero emissions levels. As a diesel fuel additive, supplemental reformate may enhance operation of premixed combustion in diesel engines. Reformate can be injected into the vehicle exhaust stream to improve NOx reduction and/or as a source of clean chemical energy for improved thermal management of exhaust components (for example, NOx traps, particulate filters and catalytic converters).

Fuel/air mixture preparation constitutes a key factor in the reforming quality of catalytic reformers, and also the performance of porous media combustors. A problem in the prior art has been how to vaporize fuel completely and uniformly, especially at start-up when the apparatus is cold. A related problem is that injected fuel droplets may follow a line-of-sight path directly to the entry surface of the catalyst, resulting in extreme, localized fuel/air inhomogeneities. Inhomogeneous fuel/air mixtures can lead to decreased reforming efficiency and reduced catalyst durability through coke or soot formation on the catalyst and thermal degradation from local hot spots. Poor fuel vaporization can lead to fuel puddling, resulting in uncertainty in the stoichiometry of fuel mixture. Complete and rapid fuel vaporization well ahead of the catalyst is a key step to achieving a homogeneous gaseous fuel-air mixture and consequent efficient reformate generation.

Fuel vaporization is especially challenging under cold start and warm-up conditions for a fuel reformer. In the prior art, it is known to vaporize injected fuel by preheating the incoming air stream to be mixed with the fuel, or by preheating a reformer surface for receiving a fuel spray. However, none of the prior art approaches is entirely successful in providing reliable, complete vaporization of injected liquid fuel under start-up conditions.

During start-up in a typical prior art fast light-off reformer, fuel and air are mixed stoichiometrically (or nearly-stoichiometrically) and burned in the fuel/air mixing chamber, and the hot combustion products are passed through the catalyst bed. This combustion phase provides the initial energy required to light-off the reforming catalyst and heats the fuel/air mixing zone to assist in fuel vaporization.

After a brief combustion period, typically about 2 to 20 seconds, combustion is quenched and a very rich fuel/air mixture is supplied to initiate reformate production. The atomized fuel mixes with the airflow within the volume defining the mixing zone prior to reacting within the catalyst. The energy generated during the reforming process (exothermic reaction) continues to heat the reformer, including a heat exchange section downstream of the reforming catalyst. Under warmed-up operation, the heat exchange section transfers heat from the hot reformate gas to the incoming airflow. This heat exchange provides energy to the mixing zone to assist fuel vaporization.

After the end of combustion but while the reformer is warming up, a transitional heat deficit develops in heat energy available in the mixing chamber for fuel vaporization. This deficit arises because the heat energy stored in the mixing section of the reformer during the combustion stage is depleted during early reforming before the heat exchange section is sufficiently warm to provide substantial heat from the reforming process back into the incoming airflow. The extent and duration of this deficit is dependent upon a number of factors, including heat generated and stored during combustion, the thermal mass of the catalyst and heat exchange section, and heat transfer rates within the reformer assembly. The maximum temperature that the catalyst face can sustain without thermal degradation of the catalyst, which typically is about 1100-1200° C., limits the duration of combustion, which thus limits the amount of energy that may be stored and available for fuel vaporization during early reforming.

What is needed in the art is a compact reformer arrangement that provides sufficient volume, residence time, and heat to accomplish good fuel/air mixing and heating following a combustion phase during warm up of a hydrocarbon catalytic reformer.

It is a primary object of the invention to reduce or eliminate the transitional heat deficit experienced by prior art reformers during start-up of the reformer.

SUMMARY OF THE INVENTION

A catalytic reformer assembly comprises a cylindrical mixing chamber wherein fuel and air are mixed, initially for a combustion phase to heat the reformer, and subsequently for supplying a fuel/air mixture to the catalyst bed for reforming during a catalytic reforming phase. The mixing chamber decreases in diameter toward its outlet end. The catalyst bed is formed in an annular shape and surrounds the mixing zone outlet end such that the walls of the mixing chamber shield the catalyst from line-of-sight exposure to fuel droplets injected at the entrance end of the mixing chamber. The fuel/air mixture flows out of the mixing chamber, then turns to flow back through the catalyst bed outside of and surrounding the end of the mixing chamber. Hot reformate from the catalyst bed flows in an annular flow chamber along the outer surface of the walls of the mixing chamber in a direction counter to the direction of materials flow through the mixing chamber, which walls are heated thereby, providing a hot surface in the mixing chamber for instantaneous evaporation of injected fuel. Preferably, the reformate flow chamber is annular and extends the full length of the mixing chamber. Preferably, a plenum for incoming air surrounds the reformate flow chamber and is also heated thereby. The fuel injector may be located either near the air entry to the mixing chamber, for co-flow of air and fuel therethrough, or near the mixture exit from the mixing chamber, for counter-flow injection of fuel into the mixing chamber.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
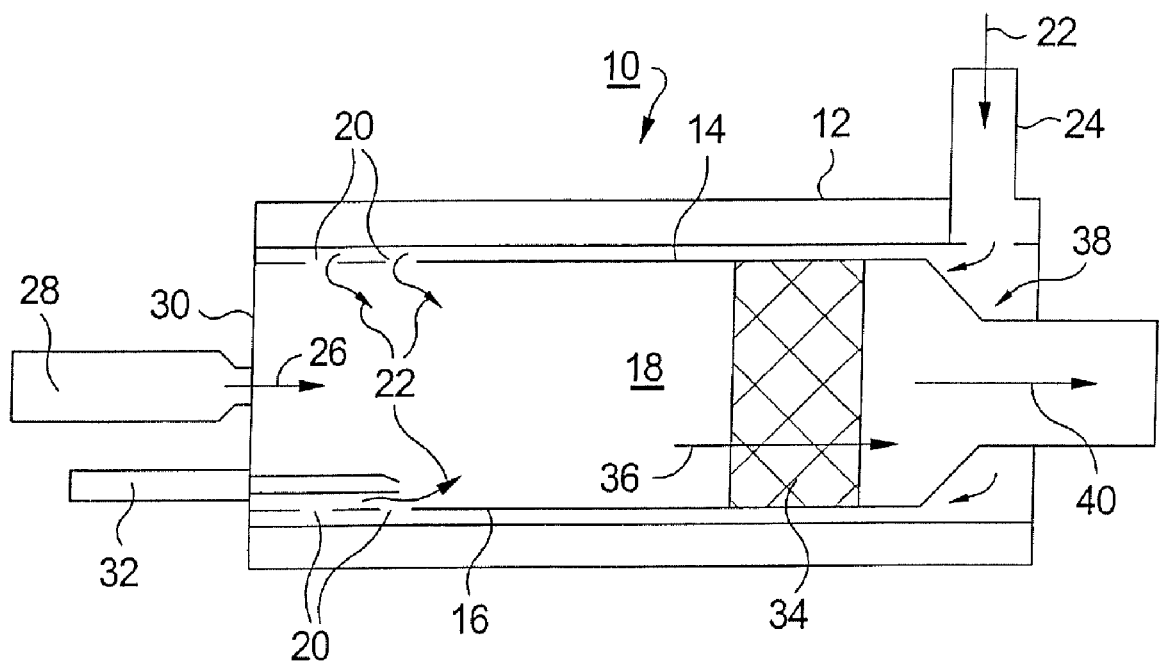
FIG. 1 is a schematic longitudinal cross-sectional view of a prior art catalytic hydrocarbon reformer assembly.

Referring to FIG. 1, a prior art fast light-off catalytic reformer assembly 10 comprises a jacket 12 concentric with a cylindrical reactor 14 defining an annular heat-exchanging plenum 16 therebetween which is closed at both axial ends. Plenum 16 communicates with a reforming chamber 18 within reactor 14 via a plurality of openings 20 formed in the wall of reactor 14. Air 22 for combustion and for reforming enters reformer assembly 10 via inlet duct 24 formed in the wall of jacket 12. Fuel 26 is injected by a fuel injector 28 mounted in end 30 directly into reforming chamber 18 wherein the fuel mixes with air 22 entering from chamber 16 via openings 20. An igniter 32 such as a spark plug or other ignition source is disposed through end 30 of reactor 14 into chamber 18. Reforming catalyst 34 is disposed in reactor 14 downstream of the flow of mixture 36 through chamber 18. Downstream of catalyst 34 is a heat exchanger 38. Intake air 22 is passed through a first side of heat exchanger 38 and hot combustion or reformate gases 40 exiting catalyst 34 are passed through a second side, thus heating intake air 22.

It will be seen that heat exchanger 38 is isolated from the combustion that initially occurs in the reforming chamber 18 prior to reforming. Consequently, until the heat exchanger 38 is sufficiently warmed-up by reformate 40, energy to vaporize the fuel spray is available only from the heat stored in the walls of reactor 14 during the initial combustion phase; hence, a heat deficit for vaporization of injected fuel is seen, as described above, in the time between cessation of combustion and sufficient warmup of heat exchanger 38.

A reformer in accordance with the present invention improves upon this arrangement by providing a heat exchanging wall between the incoming air and the reformate that is directly preheated by the initial combustion phase and heated during the catalytic reforming phase by heated reformate. The improved arrangement thus eliminates the heat deficit in the prior art described above and thus maintains more energy during warm-up of the reactor to assist in vaporizing fuel droplets.

Figure 2:
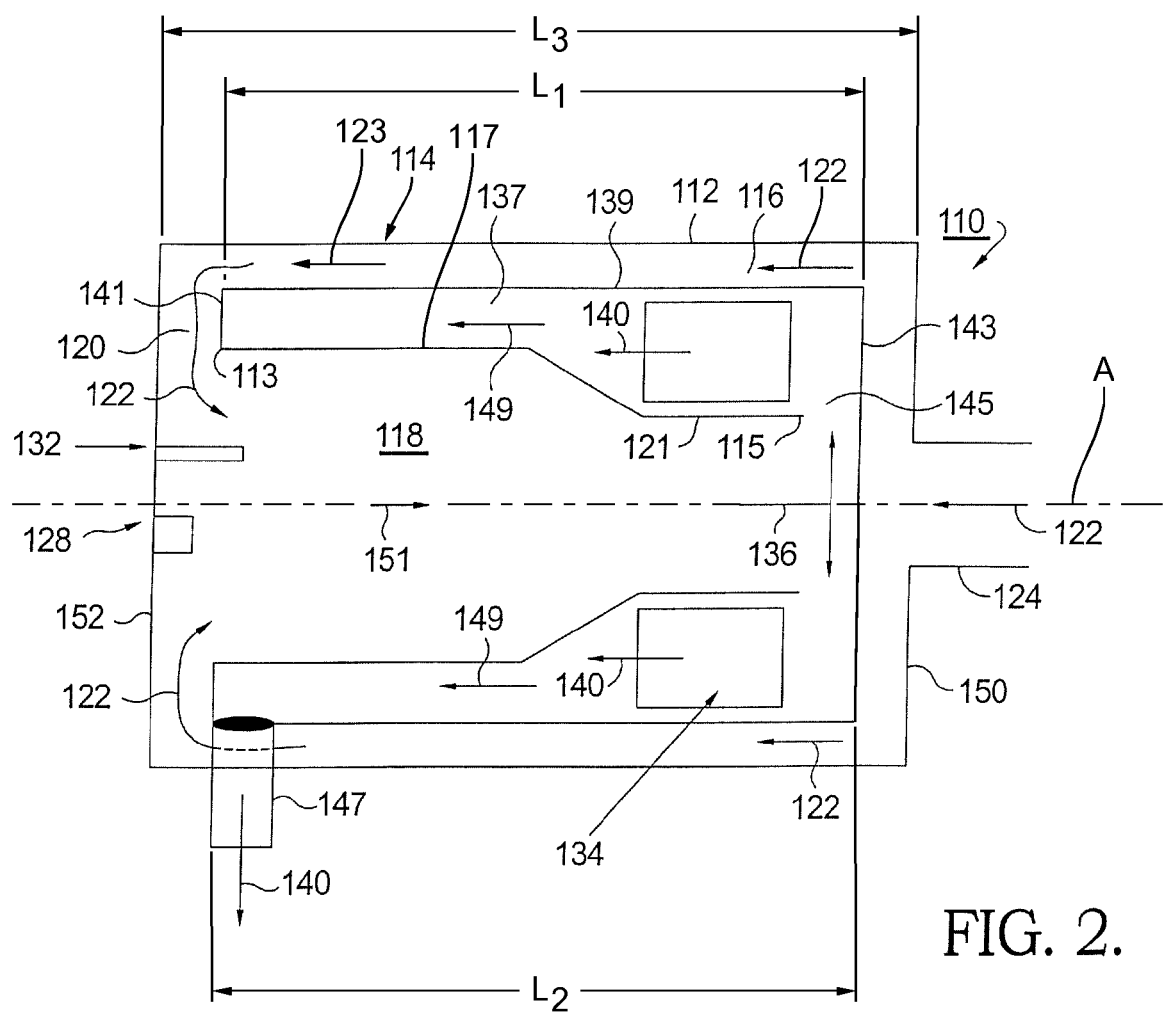
FIG. 2 is a schematic longitudinal cross-sectional view of a first embodiment of a catalytic hydrocarbon reformer assembly in accordance with the invention.

Referring to FIG. 2, a first embodiment 110 of a fast light-off catalytic reformer assembly in accordance with the invention comprises a reactor 114 having a longitudinal axis A. Reactor 114 preferably has a generally cylindrical form and includes a mixing chamber 118 being open at inlet end 113 and outlet end 115. In an aspect of the present invention, mixing chamber 118 is longitudinally tapered or funnel-shaped such that outlet end 115 is smaller in diameter than inlet end 113. Reactor 114 defines a mixing chamber 118 as described below.

Surrounding smaller diameter portion 121 of mixing chamber 118 is a ring-shaped reforming catalyst bed 134 for generating reformate 140 from a fuel/air mixture 136. A reforming chamber 137 is defined by an inner and outer longitudinal wall 117, 139 and endwalls 141,143. Inner wall 117 of reforming chamber 137 is formed in reactor 114 such that the entire axial length of mixing chamber 118, from inlet end 113 to outlet end 115, defines a partition for exchanging heat from reformate 140 to mixing chamber 118. Reformate 140 flows in a third flow direction 149 and fuel/air materials within mixing chamber 118 flow in a first flow direction 151 opposite third flow direction 149. An entrance 145 to reforming chamber 137 is at outlet end 115 of mixing chamber 118. An outlet 147 of reforming chamber 137 is a radial duct.

It will be seen that, contrary to the flow arrangement in prior art reformer assembly 10, the initial combustion phase within mixing chamber 118 preheats a heat exchanging surface between reforming chamber 137 and mixing chamber 118. Further, prior art reformers do not provide direct heating of the mixing chamber by exposure of the reactor walls to hot reformate.

A jacket 112 surrounds longitudinal wall 139 defining a plenum 116 for passage of air 122 from an inlet duct 124 in jacket endwall 150 into mixing chamber 118 via a radial passage 120. A fuel injector 128 and ignition device 132 are disposed in jacket endwall 152.

It will be observed that inlet air 122, flowing in a second flow direction 123, passes along the entire length $L_1$ of outer longitudinal wall 139 and endwalls 141,143 of reforming chamber 137. Thus, air 122 flowing along longitudinal wall 139, offers the maximum possible heat exchange opportunity between hot reformate 140 and inlet air 122. Further, prior art reformers do not provide direct heating of inlet air by exposure of air to hot reformate over the axial length $L_2$ of the mixing chamber. An axial plenum length $L_3$ along longitudinal wall 139 extends beyond axial length $L_1$ of the longitudinal wall 139 and axial length $L_2$ of the mixing chamber 118.

Figure 3:
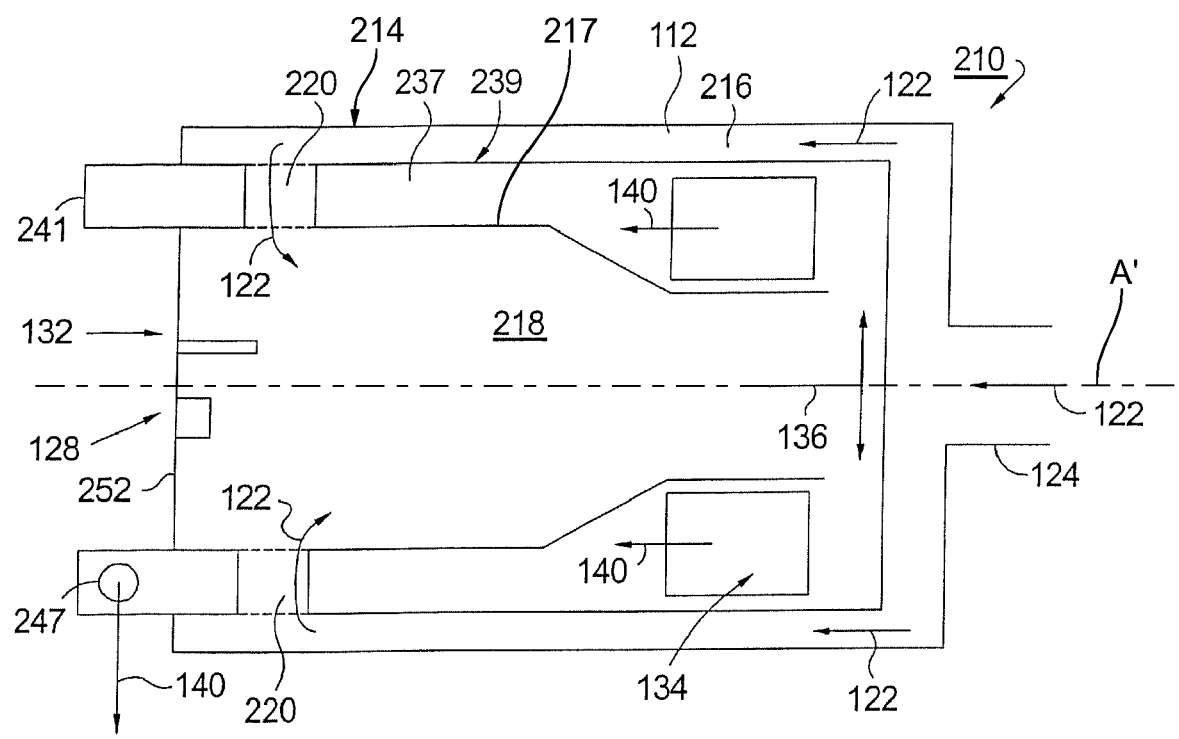
FIG. 3 is a schematic longitudinal cross-sectional view of a second embodiment of a catalytic hydrocarbon reformer assembly in accordance with the invention.

Referring now to FIG. 3, a second embodiment 210 of a fast light-off catalytic reformer assembly having an axis A' in accordance with the invention is similar in many respects to first embodiment 110, and common elements are so numbered. Different but analogous elements are number similarly but in the 200 series. The significant difference over first embodiment 110 is that the reforming chamber 237 of reactor 214 is carried through the upstream reformer wall 252 to extend even further the heat exchange surface area of both the inner and outer walls 217,239 of the reforming chamber. Heated inlet air 122 enters mixing chamber 218 via a plurality, preferably six, of radial passages 220 extending from air plenum 216 through reforming chamber 237.

Figure 4:
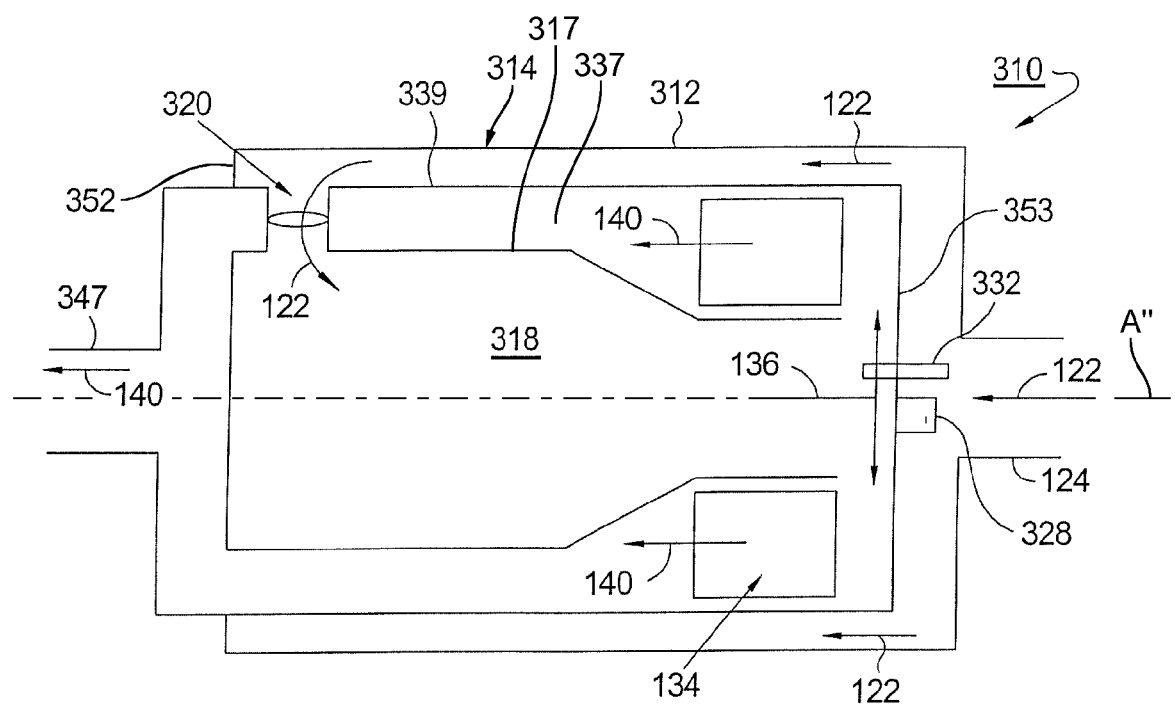
FIG. 4 is a schematic longitudinal cross-sectional view of a third embodiment of a catalytic hydrocarbon reformer assembly in accordance with the invention.

Referring now to FIG. 4, a third embodiment 310 of a fast light-off catalytic reformer assembly having an axis A" in accordance with the invention is similar in many respects to second embodiment 210, and common elements are so numbered. Different but analogous elements are number similarly but in the 300 series. The significant difference over first and second embodiments 110,210 is that the reformate chamber 337 extends through jacket end wall 352 and completely surrounds and defines mixing chamber 318. Reformate 140 exits via an axial duct 347, which is a packaging improvement for a reformer in an automotive system. Thus, reactor 314 comprises inner wall 317 of reformate chamber 337, thereby exposing mixing chamber 318 to heat from hot reformate gas 140 transferred through inner wall 317. In one aspect of the invention, fuel injector 328 is moved to the downstream end 353 of the mixing chamber 318 such that fuel is injected into mixing chamber 318 in counterflow to air 122 moving through the chamber, thus improving turbulence and mixing. Likewise, igniter 332 is moved to end 353.

In one method in accordance with the invention for operating any of reformer assemblies 110,210,310 (using only the numbers of assembly 110 for simplicity), during start-up from a cold start, fuel spray is injected by fuel injector 128 into mixing chamber 118 wherein the fuel is mixed with air 122 in a near-stoichiometric ratio, and ignited by igniter 132 to form hot exhaust gases which immediately begin to heat the walls of reformate chamber 137 including the outer reformate wall 139, and catalyst bed 134.

After combustion has proceeded for a few seconds, ignition by ignitor 132 is terminated. Fuel flow is also terminated for a brief period to cause the preheat flame to be extinguished prior to commencing reforming. The fuel ratio is then made richer in fuel, and fuel/air mix 136 is passed into the reforming catalyst 134 to begin generation of reformate 140.

The present fast light-off catalytic reformer assembly and methods of operation rapidly produce high yields of reformate fuel without significant coking or hot-spotting of the reactor or reforming catalyst during start-up.

The produced reformate 140 may be bottled in a vessel or used to fuel any number of systems operating partially or wholly on reformate fuel. Such power generation systems for reformer assembly 110 may include, but are not limited to, engines such as spark ignition engines, hybrid vehicles, diesel engines, fuel cells, particularly solid oxide fuel cells, or combinations thereof. The present fast light-off reformer and method may be variously integrated with such systems, as desired. For example, the present fast light-off reformer may be employed as an on-board reformer for a vehicle engine 400 operating wholly or partially on reformate, the engine having a fuel inlet in fluid communication with the reformer outlet for receiving reformate 140 therefrom.

The present fast light-off reformer and methods are particularly suitable for use as an on-board reformer for quickly generating reformate 140 for initial start-up of a system. The present reformer and methods are particularly advantageous for hydrogen cold-start of an internal combustion engine, providing a supply of hydrogen-rich reformate which allows the engine exhaust to meet SULEV emissions levels immediately from cold-start. The present fast light-off reformer and methods are also particularly suitable for use as an on-board reformer for quickly generating reformate for use to improve premixed combustion in a diesel engine. A third application for with the present fast light-off reformer and methods are suitable comprises injecting the reformate into the vehicle exhaust stream to improve NOx reduction and/or as a source of clean chemical energy for improved thermal management of exhaust components (for example, NOx traps, particulate filters and catalytic converters). Vehicles wherein a fast light-off reformer is operated in accordance with the present invention may include automobiles, trucks, and other land vehicles, boats and ships, and aircraft including spacecraft.

While the invention has been described by reference to certain preferred embodiments, it should be understood that numerous changes may be made within the spirit and scope of the inventive concepts described. Accordingly, it is intended that the invention not be limited to the disclosed embodiments, but that it have the full scope permitted by the language of the following claims.

What is claimed is:

1. A catalytic reformer assembly for generating hydrogen-containing reformate from hydrocarbons, comprising:

a reactor having a longitudinal axis and a longitudinal wall disposed about the axis, said reactor having a first axial end wall and a second axial end wall remote from the first axial end wall;

a reforming chamber disposed in the reactor about the axis defining an inbound co-axial mixing chamber, the reforming chamber including an inner chamber wall adjacent the mixing chamber and an outer chamber wall adjacent the longitudinal wall of the reactor, the mixing chamber having an entrance end adjacent the first axial end wall and an exit end remotely opposite the entrance end proximate to second axial end wall, and the entrance end to the exit end defining a first flow direction for a fuel/air mixture disposed in the mixing chamber, and the reforming chamber being in downstream fluid communication from the mixing chamber;

an air inlet duct disposed in a wall of the reactor to provide a supply of air to the mixing chamber;

a plenum defined between the longitudinal wall of the reactor and the outer chamber wall therebetween and being an intermediate fluid conduit for air supplied from the air inlet duct and delivered to a passage at the entrance end of the mixing chamber defining a second flow direction;

a reforming catalyst disposed in the reforming chamber such that reformate issues from the reforming catalyst in the reforming chamber defining a third flow direction; and a reformate outlet duct being in fluid communication to the reformate chamber, the reformate outlet duct being a fluid conduit for reformate to exit the reforming chamber;

wherein air flows through the air inlet duct and into the plenum in the second flow direction toward the first axial end wall, and a fuel/air mixture configured in the mixing chamber flows in the first flow direction opposite the second flow direction, and the reformate flows in the third flow direction in the reforming chamber in the same direction as the second flow direction such that the reformate warms the reformate chamber walls to directly transfer heat to warm the air flowing through the plenum toward the mixing chamber and the fuel/air mixture flowing through the mixing chamber toward the reformate chamber.

2. The reformer assembly in accordance with claim 1 wherein said reformate chamber outer wall adjacent to the reactor longitudinal wall has a first longitudinal length and said mixing chamber has a second longitudinal length, and said first longitudinal length and said second longitudinal length are substantially equal.

3. The reformer assembly in accordance with claim 2 wherein said plenum adjacent to the reformate chamber outer wall has a third longitudinal length, said third longitudinal length being greater than said first and second longitudinal length.

4. The reformer assembly in accordance with claim 1 further comprising a fuel injector being in flow communication to said mixing chamber being disposed in the first axial end wall of the reactor adjacent to said entrance end such that said fuel is injected into the mixing chamber in the first flow direction.

5. The reformer assembly in accordance with claim 4 further comprising an ignition device in communication with said mixing chamber disposed in the first axial end wall adjacent to said entrance end.

6. The reformer assembly in accordance with claim 1 further comprising a fuel injector being in flow communication to said mixing chamber being disposed at said exit end such that said fuel is injected into the mixing chamber counter to said first flow direction.

7. The reformer assembly in accordance with claim 6 further comprising an ignition device in communication with said mixing chamber disposed at said exit end.

8. The reformer assembly in accordance with claim 1 wherein said reformate chamber comprises a reformate chamber extending beyond the first axial end wall of the reactor.

9. The reformer assembly in accordance with claim 1 wherein said reactor longitudinal wall and said reformate chamber outer wall comprise cylindrical form about the axis.

10. The reformer assembly in accordance with claim 1 wherein the plenum commences outbound from, and adjacent to said exit end and terminates adjacent said first axial end wall, said air inlet duct being in fluid connection to the plenum at the second axial end wall.

11. The reformer assembly in accordance with claim 10 wherein the air inlet duct is disposed at the second axial end wall and the reformate outlet duct is disposed remote from the air inlet duct proximate to the first axial end wall.

12. The reformer assembly in accordance with claim 1 wherein the mixing chamber comprises a first width at the entrance end and a second width at the exit end, and the first width is greater than the second width.

13. The reformer assembly in accordance with claim 12 wherein the reforming catalyst is formed about the axis comprising a ring shape and disposed in the reforming chamber proximate to the exit end, said ring shape encircling a portion of the mixing chamber having the second width.

14. The reformer assembly in accordance with claim 1 wherein the reformate chamber has a first reformate chamber width proximate to the first axial end wall and a second reformate chamber width proximate to the second axial end wall, said second reformate chamber width being greater than the first reformate chamber width.

15. The reformer assembly in accordance with claim 1 wherein the first and second and third flow direction comprise axial flow direction.

* * * * *